United States Patent

[11] 3,596,075

[72] Inventor Jan Leonardus van Weelden
Apeldoornseweg, Beekbergen, Netherlands
[21] Appl. No 733,627
[22] Filed May 31, 1968
[45] Patented July 27, 1971
[73] Assignee U.S. Philips Corporation
New York, N.Y.
[32] Priority June 1, 1967
[33] Netherlands
[31] 6707613

[54] BINARY ARITHMETIC UNIT
4 Claims, 13 Drawing Figs.

[52] U.S. Cl. .......... 235/175, 235/168, 307/207, 235/176
[51] Int. Cl. .......... G06f 7/385, G06f 7/38
[50] Field of Search .......... 235/168, 173, 175, 176; 340/172.55; 307/215, 207; 328/158

[56] References Cited

UNITED STATES PATENTS

| | | | |
|---|---|---|---|
| 3,125,675 | 3/1964 | Jeeves | 235/175 |
| 3,125,676 | 3/1964 | Jeeves | 235/175 |
| 3,388,239 | 6/1968 | Duncan et al. | 235/175 |
| 3,407,357 | 10/1968 | Spandorfer et al. | 235/176 X |
| 3,465,133 | 9/1969 | Booker | 235/176 X |
| 3,381,117 | 4/1968 | Forslund et al. | 307/215 X |
| 3,428,903 | 2/1969 | Forslund et al. | 307/215 X |

*Primary Examiner*—Malcolm A. Morrison
*Assistant Examiner*—James F. Gottman
*Attorney*—Frank R. Trifari

ABSTRACT: An arithmetic unit wherein four input NAND elements each receive two bivalent input signals and one bivalent control signal. An intermediate NAND gate and two output NAND gates operating in conjunction with the input NAND gates combine the bivalent signals to perform 16 arithmetic functions.

INVENTOR.
JAN L.VAN WEELDEN

BY

AGENT

Figure 1:
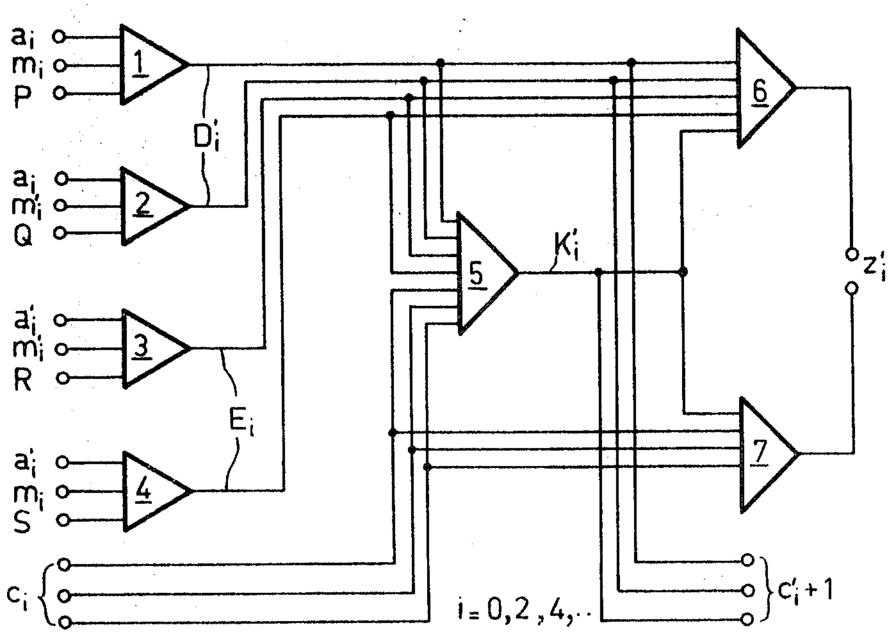

| | Nr | P | Q | R | S | $a_i$ | $m_i$ | $c_i$ | $z_i$ | $c_{i+1}$ | $a'_i$ | $m'_i$ | $c'_i$ | $z'_i$ | $c'_{i+1}$ | $D'_i$ | $E_i$ | $K'_i$ | $z'_i$ * | $c'_{i+1}$ * |
|---|---|---|---|---|---|---|---|---|---|---|---|---|---|---|---|---|---|---|---|---|
| FIG.1 | 1 | 1 | 0 | 1 | 0 | 0 | 0 | 0 | 0 | 0 | 1 | 1 | 1 | 1 | 1 | 1 1 | 0 1 | 1 | 1 1 | 1 1 1 |
| | 2 | 1 | 0 | 1 | 0 | 1 | 0 | 0 | 1 | 0 | 0 | 1 | 1 | 0 | 1 | 1 1 | 1 1 | 1 | 0 1 | 1 1 1 |
| | 3 | 1 | 0 | 1 | 0 | 0 | 1 | 0 | 1 | 0 | 1 | 0 | 1 | 0 | 1 | 1 1 | 1 1 | 1 | 0 1 | 1 1 1 |
| | 4 | 1 | 0 | 1 | 0 | 1 | 1 | 0 | 0 | 1 | 0 | 0 | 1 | 1 | 0 | 0 1 | 1 1 | 1 | 1 1 | 0 1 1 |
| | 5 | 1 | 0 | 1 | 0 | 0 | 0 | 1 | 1 | 0 | 1 | 1 | 0 | 0 | 1 | 1 1 | 0 1 | 1 | 1 0 | 1 1 1 |
| | 6 | 1 | 0 | 1 | 0 | 1 | 0 | 1 | 0 | 1 | 0 | 1 | 0 | 1 | 0 | 1 1 | 1 1 | 0 | 1 1 | 1 1 0 |
| | 7 | 1 | 0 | 1 | 0 | 0 | 1 | 1 | 0 | 1 | 1 | 0 | 0 | 1 | 0 | 1 1 | 1 1 | 0 | 1 1 | 1 1 0 |
| | 8 | 1 | 0 | 1 | 0 | 1 | 1 | 1 | 1 | 1 | 0 | 0 | 0 | 0 | 0 | 0 1 | 1 1 | 1 | 1 0 | 0 1 1 |

Figure 2:
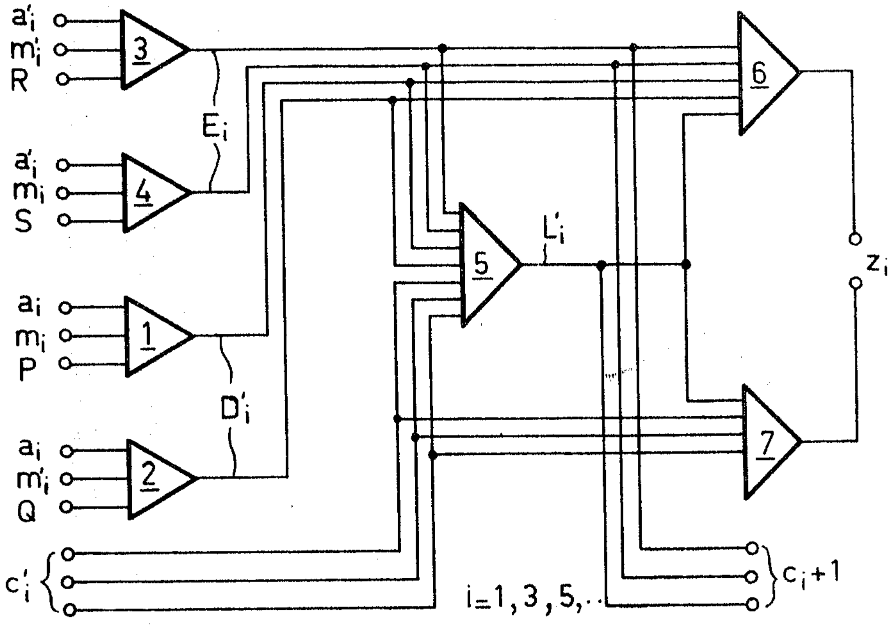

| | Nr | P | Q | R | S | $a_i$ | $m_i$ | $c_i$ | $z_i$ | $c_{i+1}$ | $a'_i$ | $m'_i$ | $c'_i$ | $z'_i$ | $c'_{i+1}$ | $D'_i$ | $E_i$ | $L'_i$ | $z_i$ * | $c_{i+1}$ * |
|---|---|---|---|---|---|---|---|---|---|---|---|---|---|---|---|---|---|---|---|---|
| FIG.2 | 1 | 1 | 0 | 1 | 0 | 0 | 0 | 0 | 0 | 0 | 1 | 1 | 1 | 1 | 1 | 1 1 | 0 1 | 1 | 1 0 | 0 1 1 |
| | 2 | 1 | 0 | 1 | 0 | 1 | 0 | 0 | 1 | 0 | 0 | 1 | 1 | 0 | 1 | 1 1 | 1 1 | 0 | 1 1 | 1 1 0 |
| | 3 | 1 | 0 | 1 | 0 | 0 | 1 | 0 | 1 | 0 | 1 | 0 | 1 | 0 | 1 | 1 1 | 1 1 | 0 | 1 1 | 1 1 0 |
| | 4 | 1 | 0 | 1 | 0 | 1 | 1 | 0 | 0 | 1 | 0 | 0 | 1 | 1 | 0 | 0 1 | 1 1 | 1 | 1 0 | 1 1 1 |
| | 5 | 1 | 0 | 1 | 0 | 0 | 0 | 1 | 1 | 0 | 1 | 1 | 0 | 0 | 1 | 1 1 | 0 1 | 1 | 1 1 | 0 1 1 |
| | 6 | 1 | 0 | 1 | 0 | 1 | 0 | 1 | 0 | 1 | 0 | 1 | 0 | 1 | 0 | 1 1 | 1 1 | 1 | 0 1 | 1 1 1 |
| | 7 | 1 | 0 | 1 | 0 | 0 | 1 | 1 | 0 | 1 | 1 | 0 | 0 | 1 | 0 | 1 1 | 1 1 | 1 | 0 1 | 1 1 1 |
| | 8 | 1 | 0 | 1 | 0 | 1 | 1 | 1 | 1 | 1 | 0 | 0 | 0 | 0 | 0 | 0 1 | 1 1 | 1 | 1 1 | 1 1 1 |

FIG. 3

| P Q R S | Z |
|---|---|
| 0 0 1 1 | A + co |
| 0 0 0 1 | (A v M') + co |
| 0 0 1 0 | (A v M) + co |
| 1 1 0 0 | A - co' |
| 0 1 0 0 | (A ∧ M') - co' |
| 1 0 0 0 | (A ∧ M) - co' |
| 1 1 1 1 | 2A + co |
| 1 0 1 0 | A + M + co |
| 0 1 0 1 | A + M' + co |
| 0 1 1 1 | A + (A ∧ M') + co |
| 1 0 1 1 | A + (A ∧ M) + co |
| 1 1 0 1 | A + (A v M') + co |
| 1 1 1 0 | A + (A v M) + co |
| 1 0 0 1 | A + (A • M') + co |
| 0 1 1 0 | A + (A • M) + co |
| 0 0 0 0 | - co' |

FIG. 4

INVENTOR.
JAN L. VAN WEELDEN

BY

Frank R. Trifari

AGENT

INVENTOR.
JAN L.VAN WEELDEN
BY
AGENT

| | Z | |
|---|---|---|
| PQRS | X = 1 | X=0 |
| 0011 | A + co | A |
| 0001 | (A v M')+co | A v M' |
| 0010 | (A v M) + co | A v M |
| 1100 | A - co' | A' |
| 0100 | (A ∧ M') - co' | A' v M |
| 1000 | (A ∧ M) - co' | A' v M' |
| 1111 | 2A + co | 0 |
| 1010 | A + M + co | A ⊕ M |
| 0101 | A + M' + co | A ⊕ M' |
| 0111 | A+(A ∧ M')+ co | A ∧ M |
| 1011 | A +(A ∧ M)+ co | A ∧ M' |
| 1101 | A +(A v M')+ co | A' ∧ M' |
| 1110 | A +(A v M) + co | A' ∧ M |
| 1001 | A +(A ⊕ M')+ co | M' |
| 0110 | A +(A ⊕ M) + co | M |
| 0000 | - co' | -1 |

FIG. 7

INVENTOR.
JAN L.VAN WEELDEN
BY
[signature]
AGENT

INVENTOR.
JAN L. VAN WEELDEN
BY
AGENT

INVENTOR.
JAN L. VAN WEELDEN
BY
AGENT

| | | z | |
|---|---|---|---|
| $X_1$ | P Q R S | X=1 | X=0 |
| 1 | 0 0 1 1 | A+co | A |
| 1 | 0 0 0 1 | (AvM')+co | AvM' |
| 1 | 0 0 1 0 | (AvM)+co | AvM |
| 1 | 1 1 0 0 | A-co' | A' |
| 1 | 0 1 0 0 | (A∧M')-co' | A'vM |
| 1 | 1 0 0 0 | (A∧M)-co' | A'vM' |
| 1 | 1 1 1 1 | 2.A+co | 0 |
| 1 | 1 0 1 0 | A+M+co | A⊕M |
| 1 | 0 1 0 1 | A+M'+co | A⊕M' |
| 1 | 0 1 1 1 | A+(A∧M')+co | A∧M |
| 1 | 1 0 1 1 | A+(A∧M)+co | A∧M' |
| 1 | 1 1 0 1 | A+(AvM')+co | A'∧M' |
| 1 | 1 1 1 0 | A+(AvM)+co | A'∧M |
| 1 | 1 0 0 1 | A+(A⊕M')+co | M' |
| 1 | 0 1 1 0 | A+(A⊕M)+co | M |
| 1 | 0 0 0 0 | -co' | -1 |
| 0 | 1 1 0 0 | A'+co | A' |
| 0 | 1 0 0 0 | (A'vM')+co | A'vM' |
| 0 | 0 1 0 0 | (A'vM)+co | A'vM |
| 0 | 0 0 1 1 | A'-co' | A |
| 0 | 0 0 1 0 | (A'∧M')-co' | AvM |
| 0 | 0 0 0 1 | (A'∧M)-co' | AvM' |
| 0 | 1 1 1 1 | 2.A'+co | 0 |
| 0 | 0 1 0 1 | A'+M+co | A⊕M' |
| 0 | 1 0 1 0 | A'+M'+co | A⊕M |
| 0 | 1 1 1 0 | A'+(A'∧M')+co | A'∧M |
| 0 | 1 1 0 1 | A'+(A'∧M)+co | A'∧M' |
| 0 | 1 0 1 1 | A'+(A'vM')+co | A∧M' |
| 0 | 0 1 1 1 | A'+(A'vM)+co | A∧M |
| 0 | 0 1 1 0 | A'+(A⊕M')+co | M |
| 0 | 1 0 0 1 | A'+(A⊕M)+co | M' |
| 0 | 0 0 0 0 | -co' | -1 |

FIG.10

*INVENTOR.*
JAN L. VAN WEELDEN

BY
*[signature]*
AGENT

INVENTOR.
JAN L. VAN WEELDEN

BY
Frank R. [signature]
AGENT

INVENTOR.
JAN L. VAN WEELDEN
BY
Frank R. Trifari
AGENT

| U | T | Q | P | R | S | V | W | Z |
|---|---|---|---|---|---|---|---|---|
| 0 | 0 | 0 | 0 | 1 | 1 | 0 | 0 | A + co |
| 0 | 0 | 0 | 0 | 0 | 0 | 1 | 1 | A' + co |
| 0 | 0 | 0 | 0 | 1 | 0 | 1 | 0 | M + co |
| 0 | 0 | 0 | 0 | 0 | 1 | 0 | 1 | M' + co |
| 0 | 0 | 0 | 0 | 0 | 1 | 1 | 1 | (A'∧M') + co |
| 0 | 0 | 0 | 0 | 1 | 0 | 1 | 1 | (A'∧M) + co |
| 0 | 0 | 0 | 0 | 1 | 1 | 0 | 1 | (A∧M') + co |
| 0 | 0 | 0 | 0 | 1 | 1 | 1 | 0 | (A∧M) + co |
| 0 | 0 | 0 | 0 | 0 | 0 | 0 | 1 | (A'∨M') + co |
| 0 | 0 | 0 | 0 | 0 | 0 | 1 | 0 | (A'∨M) + co |
| 0 | 0 | 0 | 0 | 0 | 1 | 0 | 0 | (A∨M') + co |
| 0 | 0 | 0 | 0 | 1 | 0 | 0 | 0 | (A∨M) + co |
| 0 | 0 | 0 | 0 | 0 | 1 | 1 | 0 | (A⊕M') + co |
| 0 | 0 | 0 | 0 | 1 | 0 | 0 | 1 | (A⊕M) + co |
| | | | | | | | | |
| 0 | 0 | 1 | 1 | 0 | 0 | 0 | 0 | A − c'o |
| 1 | 1 | 0 | 0 | 0 | 0 | 0 | 0 | A' − c'o |
| 0 | 1 | 0 | 1 | 0 | 0 | 0 | 0 | M − c'o |
| 1 | 0 | 1 | 0 | 0 | 0 | 0 | 0 | M' − c'o |
| 1 | 0 | 0 | 0 | 0 | 0 | 0 | 0 | (A'∧M') − c'o |
| 0 | 1 | 0 | 0 | 0 | 0 | 0 | 0 | (A'∧M) − c'o |
| 0 | 0 | 1 | 0 | 0 | 0 | 0 | 0 | (A∧M') − c'o |
| 0 | 0 | 0 | 1 | 0 | 0 | 0 | 0 | (A∧M) − c'o |
| 1 | 1 | 1 | 0 | 0 | 0 | 0 | 0 | (A'∨M') − c'o |
| 1 | 1 | 0 | 1 | 0 | 0 | 0 | 0 | (A'∨M) − c'o |
| 1 | 0 | 1 | 1 | 0 | 0 | 0 | 0 | (A∨M') − c'o |
| 0 | 1 | 1 | 1 | 0 | 0 | 0 | 0 | (A∨M) − c'o |
| 1 | 0 | 0 | 1 | 0 | 0 | 0 | 0 | (A⊕M') − c'o |
| 0 | 1 | 1 | 0 | 0 | 0 | 0 | 0 | (A⊕M) − c'o |
| | | | | | | | | |
| 0 | 0 | 1 | 1 | 1 | 1 | 0 | 0 | 2.A + co |
| 1 | 1 | 0 | 0 | 0 | 0 | 1 | 1 | 2.A' + co |
| 0 | 1 | 0 | 1 | 1 | 0 | 1 | 0 | 2.M + co |
| 1 | 0 | 1 | 0 | 0 | 1 | 0 | 1 | 2.M' + co |
| 1 | 0 | 0 | 0 | 0 | 1 | 1 | 1 | 2.(A'∧M') + co |
| 0 | 1 | 0 | 0 | 1 | 0 | 1 | 1 | 2.(A'∧M) + co |
| 0 | 0 | 1 | 0 | 1 | 1 | 0 | 1 | 2.(A∧M') + co |
| 0 | 0 | 0 | 1 | 1 | 1 | 1 | 0 | 2.(A∧M) + co |
| 1 | 1 | 1 | 0 | 0 | 0 | 0 | 1 | 2.(A'∨M') + co |
| 1 | 1 | 0 | 1 | 0 | 0 | 1 | 0 | 2.(A'∨M) + co |
| 1 | 0 | 1 | 1 | 0 | 1 | 0 | 0 | 2.(A∨M') + co |
| 0 | 1 | 1 | 1 | 1 | 0 | 0 | 0 | 2.(A∨M) + co |
| 1 | 0 | 0 | 1 | 0 | 1 | 1 | 0 | 2.(A⊕M') + co |
| 0 | 1 | 1 | 0 | 1 | 0 | 0 | 1 | 2.(A⊕M) + co |

| U | T | Q | P | R | S | V | W | Z |
|---|---|---|---|---|---|---|---|---|
| 0 | 0 | 0 | 1 | 1 | 0 | 0 | 0 | A + M + co |
| 0 | 0 | 1 | 0 | 0 | 1 | 0 | 0 | A + M' + co |
| 0 | 0 | 1 | 0 | 1 | 1 | 0 | 0 | A + (A∧M') + co |
| 0 | 0 | 0 | 1 | 1 | 1 | 0 | 0 | A + (A∧M) + co |
| 0 | 0 | 1 | 1 | 0 | 1 | 0 | 0 | A + (A∨M') + co |
| 0 | 0 | 1 | 1 | 1 | 0 | 0 | 0 | A + (A∨M) + co |
| 0 | 0 | 0 | 1 | 0 | 1 | 0 | 0 | A + (A⊕M') + co |
| 0 | 0 | 1 | 0 | 1 | 0 | 0 | 0 | A + (A⊕M) + co |
| | | | | | | | | |
| 0 | 1 | 0 | 0 | 0 | 0 | 1 | 0 | A' + M + co |
| 1 | 0 | 0 | 0 | 0 | 0 | 0 | 1 | A' + M' + co |
| 1 | 0 | 0 | 0 | 0 | 0 | 1 | 1 | A' + (A'∧M') + co |
| 0 | 1 | 0 | 0 | 0 | 0 | 1 | 1 | A' + (A'∧M) + co |
| 1 | 1 | 0 | 0 | 0 | 0 | 0 | 1 | A' + (A'∨M') + co |
| 1 | 1 | 0 | 0 | 0 | 0 | 1 | 0 | A' + (A'∨M) + co |
| 1 | 0 | 0 | 0 | 0 | 0 | 1 | 0 | A' + (A⊕M') + co |
| 0 | 1 | 0 | 0 | 0 | 0 | 0 | 1 | A' + (A⊕M) + co |
| | | | | | | | | |
| 0 | 1 | 0 | 0 | 1 | 0 | 1 | 0 | M + (A'∧M) + co |
| 0 | 0 | 0 | 1 | 1 | 0 | 1 | 0 | M + (A∧M) + co |
| 0 | 1 | 0 | 1 | 0 | 0 | 1 | 0 | M + (A'∨M) + co |
| 0 | 1 | 0 | 1 | 1 | 0 | 0 | 0 | M + (A∨M) + co |
| 0 | 0 | 0 | 1 | 0 | 0 | 1 | 0 | M + (A⊕M') + co |
| 0 | 1 | 0 | 0 | 1 | 0 | 0 | 0 | M + (A⊕M) + co |
| | | | | | | | | |
| 1 | 0 | 0 | 0 | 0 | 1 | 0 | 1 | M' + (A'∧M') + co |
| 0 | 0 | 1 | 0 | 0 | 1 | 0 | 1 | M' + (A∧M') + co |
| 1 | 0 | 1 | 0 | 0 | 0 | 0 | 1 | M' + (A'∨M') + co |
| 1 | 0 | 1 | 0 | 0 | 1 | 0 | 0 | M' + (A∨M') + co |
| 1 | 0 | 0 | 0 | 0 | 1 | 0 | 0 | M' + (A⊕M') + co |
| 0 | 0 | 1 | 0 | 0 | 0 | 0 | 1 | M' + (A⊕M) + co |
| | | | | | | | | |
| 0 | 0 | 0 | 0 | 1 | 1 | 1 | 1 | co |
| 0 | 0 | 0 | 0 | 0 | 0 | 0 | 0 | − c'o |
| 1 | 1 | 1 | 1 | 0 | 0 | 0 | 0 | − 1 − c'o |

FIG. 13

INVENTOR.
JAN L. VAN WEELDEN

BY Frank R. Trifari
AGENT

BINARY ARITHMETIC UNIT

The invention relates to a unit buildup from NAND-elements for performing a number of operations on bivalent signals which may be distinguished as input signals and input carry signals. The results of the operations are delivered in the form of likewise bivalent signals which may be distinguished as output signals and output carry signals. The unit comprises a number of input NAND-elements for receiving the input signals, a further NAND-element for receiving the input carry signals and the signals generated by the input NAND-elements, a first output NAND-element which receives the signals generated by the input NAND-element which receives the input carry signals and the signal generated by the further NAND-element. The output signals appear at the output terminals of the first and second output NAND-elements. The output carry signals are generated by the further NAND-element and by an input NAND-element. Such a unit has been described in copending Pat. application Ser. No. 727,473 (PHN. 2494 ). It comprises two input NAND-elements. The input terminals of a first input NAND-element serve to receive two bivalent input signals ($a_1$ , $m_1$ ). The input terminals of a second input NAND-element serve to receive the negations of the said input signals ($a'_1$ , $m'_1$ ). These two input NAND-elements, the said further NAND-element and the two output NAND-element together form a binary full adder comprising five NAND-elements. In this adder, the output signals of the output NAND-elements are identified with the sum digit of the bivalent input signals which are each identified with a digit of the two numbers to be added. The output signals at the output terminals of one of the input NAND-elements and of the further NAND-element are identified with the output carry. Thus, this embodiment comprising five NAND-elements performs the operation of binary addition.

It is an object of the present invention to build up, by starting from the above described units and by extending it to include the smallest possible number of additional NAND-elements, a unit by means of which the greatest possible number of meaningful operations may be performed on bivalent signals and in which simultaneously, as is the case in the above-described unit, the carry propagates over the smallest possible number (one) of NAND-elements. The term "-meaningful operation" as used herein is to be understood to signify an operation, for example the said operation of addition, which leads to a solution which is useful in the practice of digital computation.

According to the invention this is achieved in that the unit mentioned in the preamble is characterized by the provision of at least four input NAND-elements which each receive two bivalent input signals and one bivalent control signal, the operation to be performed being determined by the values of the control signals.

A first preferred embodiment of a unit in accordance with the invention comprises at least seven NAND-elements of which four are input NAND-elements by means of which 16 meaningful operations, including the operation of addition, may be performed on the bivalent input signals.

A second preferred embodiment of a unit in accordance with the invention comprises 11 NAND-elements, including eight input NAND-elements, by means of which 73 meaningful operations can be performed. The structure of these preferred embodiments of the unit in accordance with the invention is very simple and the number of meaningful operations which can be performed is highly satisfactory. By extending the unit to include a number of additional NAND-elements and by using at least one additional control signal the number of meaningful operations may be further extended in a simple manner.

A third preferred embodiment of the unit in accordance with the invention consists in that an additional control signal is applied to the further NAND-element and to the second output NAND-element of a unit for performing operations on bivalent signals which are identified with the digits in the even-numbered digit places, this additional control signal being also applied to a first additional NAND-element which is also connected the output of a second additional NAND-element, the inputs of the second additional NAND-element being connected to a number of the outputs of input NAND-elements and the output carry signals being generated by the further NAND-element and the first additional NAND-element.

A fourth preferred embodiment of a unit in accordance with the invention is an extension of this third preferred embodiment in which two additional control signals are used.

Figure 5:
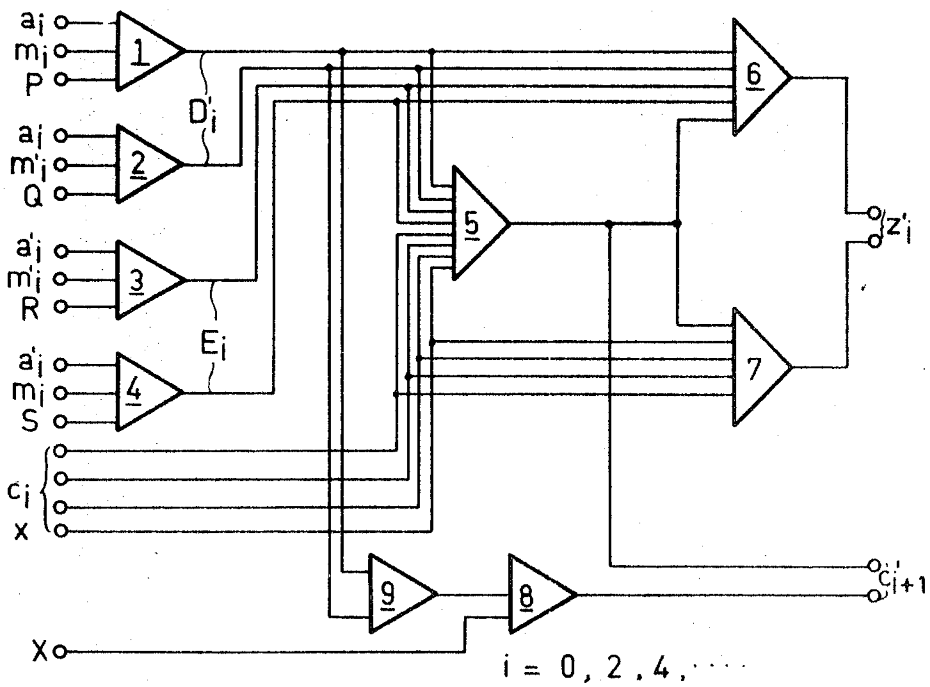
Figure 6:
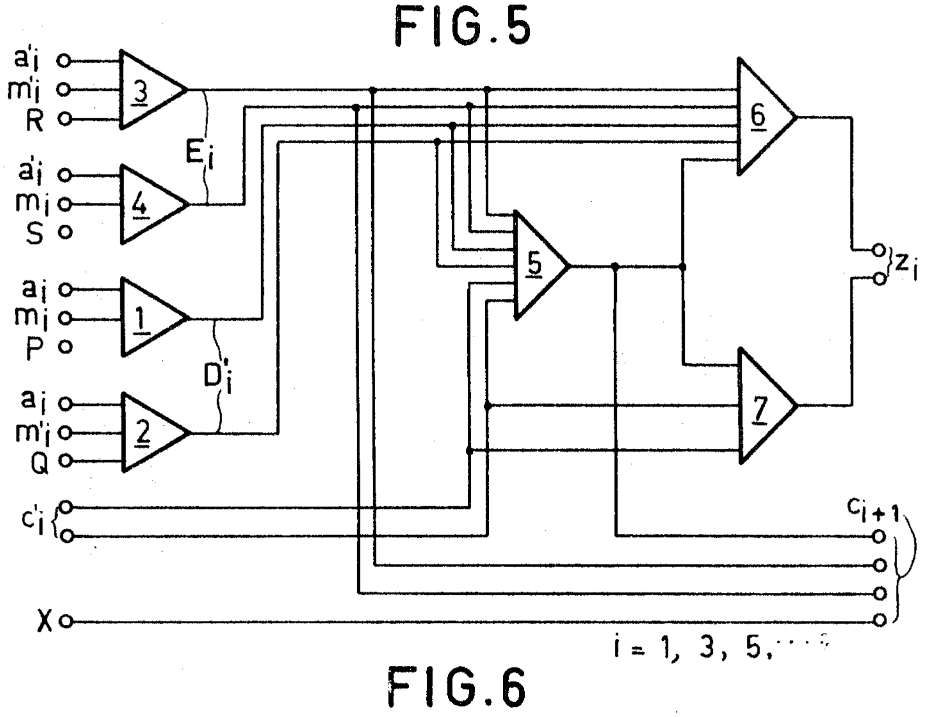
Figure 8:
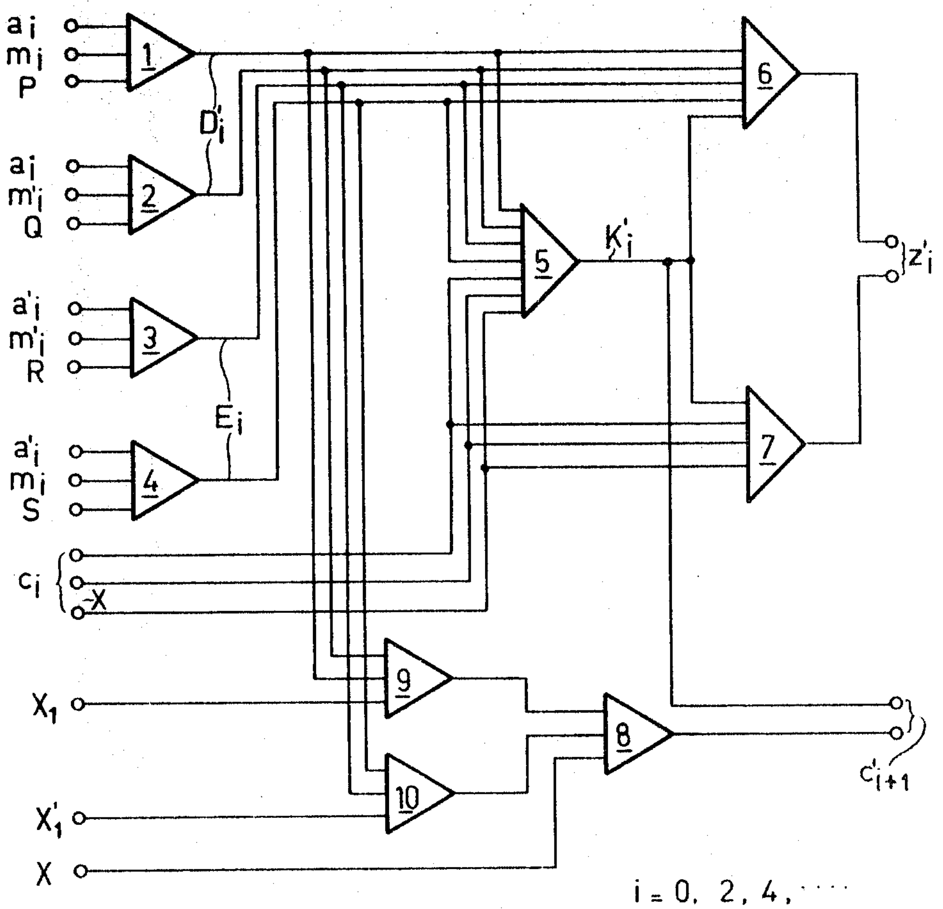
Figure 9:
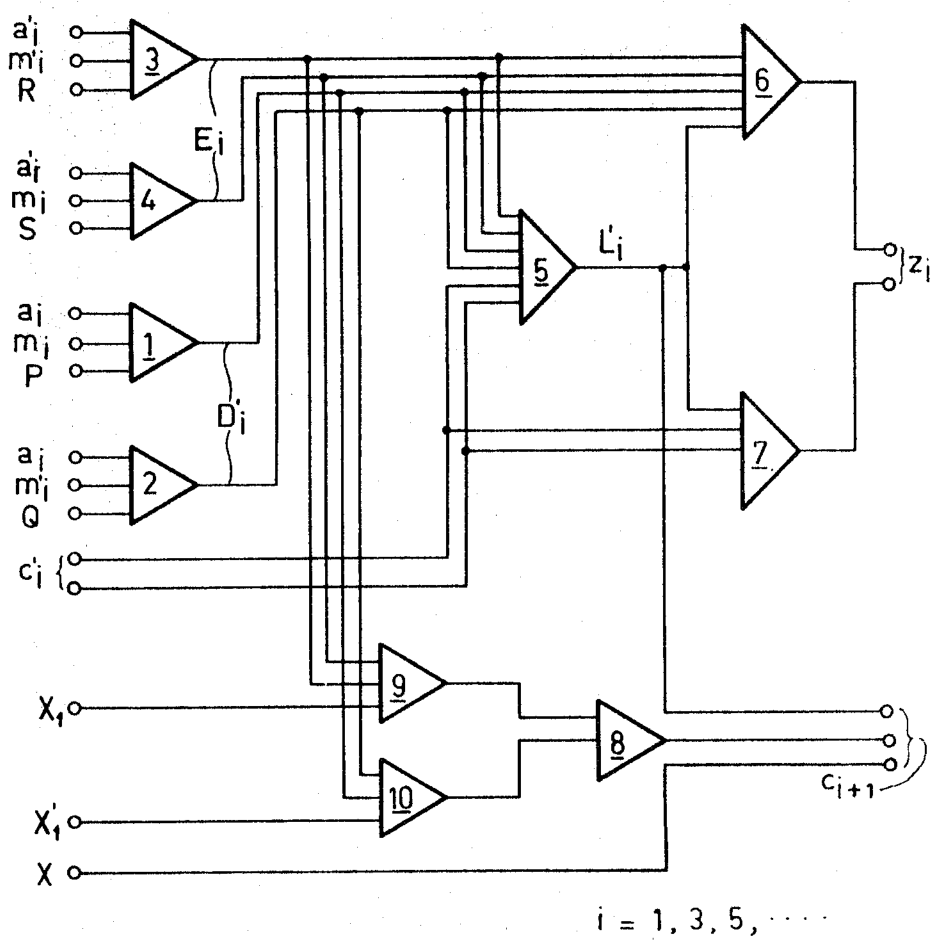
Figure 11:
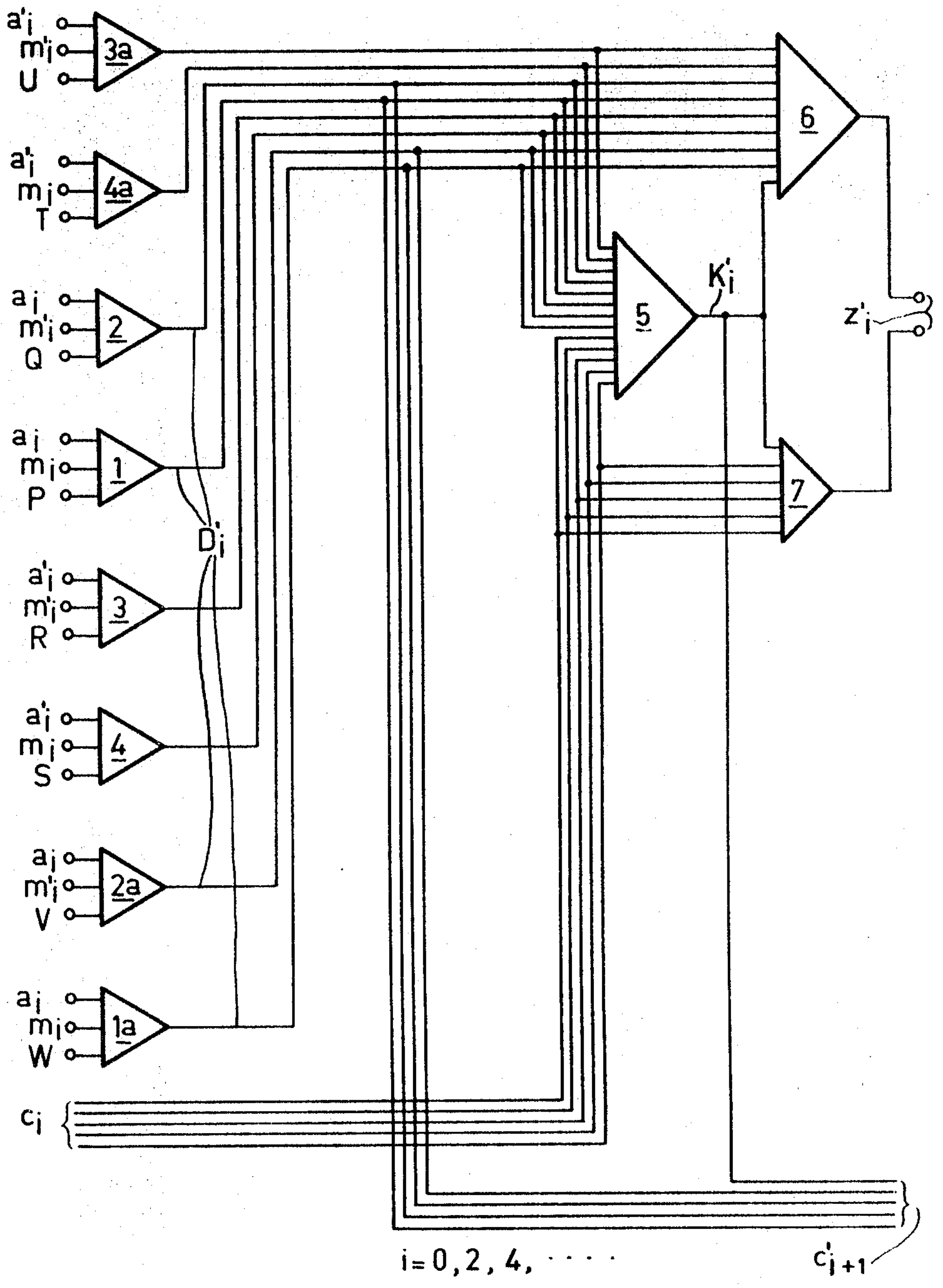
Figure 12:
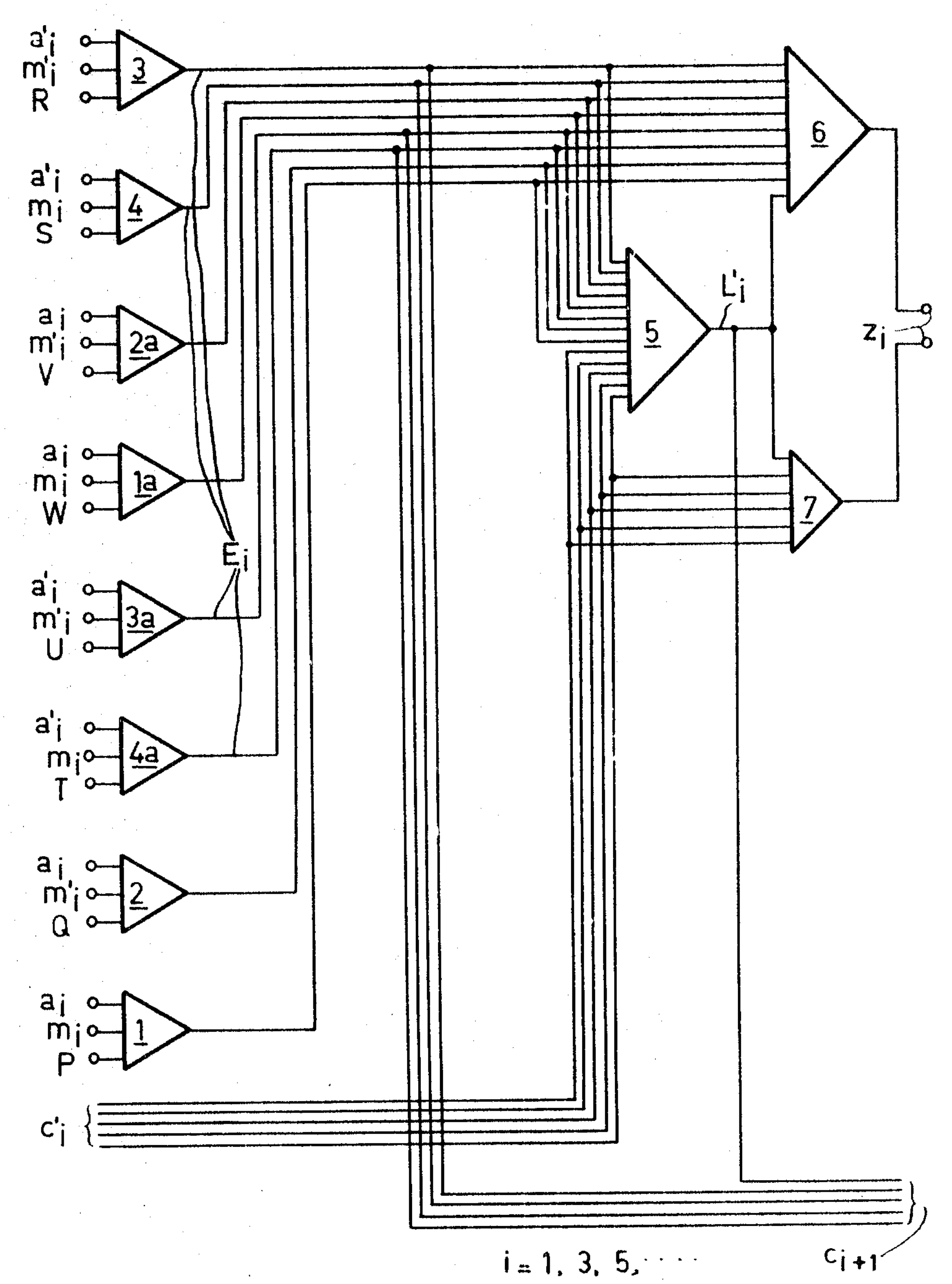

The invention will now be described more fully with reference to the accompanying diagrammatic drawings, in which FIGS. 1 and 2 show embodiments of two cooperating units in accordance with the invention, FIG. 3 shows in the form of a table an example of one of the operations (binary addition) which the units shown in FIGS. 1 and 2 can perform, FIG. 4 is a table of the operations performed by the units shown in FIGS. 1 and 2 for various values of the control signals, FIGS. 5 and 6 show a second embodiment of two cooperating units in accordance with the invention, FIG. 7 is a table of the operations performed by the units shown in FIGS. 5 and 6 various values of the control signals, FIGS. 8 and 9 show a third embodiment of the two cooperating units in accordance with the invention, FIG. 10 is a table of the operations performed by the units shown in FIGS. 8 and 9 for various values of the control signals, FIGS. 11 and 12 show a fourth embodiment of two cooperating units in accordance with the invention, and FIG. 13 is a table of the operations performed by the units shown in FIGS. 11 and 12 for various values of the control signals.

All the signals mentioned hereinafter are bivalent signals, i.e. they can only assume two values which are represented by the symbols 0 and 1. When $a$ is a signal, $a'$ is the complementary signal, i.e. the signal which has the value 1 when the signal $a$ has the value 0 and which has the value 0 when the signal $a$ has the value 1.

A bivalent signal may be composed of two or more elementary bivalent signals. Examples of such composite signals are the signals represented hereinafter by $c_i$, $c_{i+1}$, $z_i$, $D_i$ and $E_i$, etc. From the values of the elementary signals from which, for example, the signal $c_1$ is composed it must be possible to deduce unambiguously the value of the signal $c_1$.

A NAND-element is a circuit which from, for example, four bivalent signals $a$, $b$, $c$ and $d$ derives the signal $$(a\cdot b\cdot c\cdot d)'=a'+b'+c'+d' \quad (01)$$

In this formula the symbol · (which may be omitted) represents the AND-function (conjunction) and the symbol + represents the OR-function (disjunction).

When the signal $d$ permanently has the value 1, then $d'=0$ and the NAND-element generates the signal $$(a\cdot b\cdot c)'=a'+b'+c' \quad (02)$$

that is to say, an input of an AND-element may be rendered inoperative by applying to it a signal which permanently has the value 1.

When the signal $d$ permanently has the value 0, then $d'=1$, and the NAND-element, irrespective of the values of the signals $a$, $b$ and $c$, generates a signal which permanently has the value 1, that is to say, a NAND-element may be rendered inoperative as a whole by applying to one of its inputs a signal which permanently has the value 0.

By writing the formula (01) in the form $$[a\cdot b\cdot(c\cdot d)]'=a'+b'+(c\cdot d)' \quad (03)$$

It will be seen that the group of two input signals $c$ and $d$ may be replaced by a single signal $$e=cd \quad (04)$$

Obviously, this applies analogously to groups of three, four, etc., input signals.

From the formula (01) it also follows $$(a'+b'+c'+d')=(abcd)''abcd, \quad (05)$$

which formula is equivalent to the formula $$(a+b+c+c)'=a'\cdot b'\cdot c'\cdot d'. \quad (06)$$

A circuit which from four input signals $a$, $b$, $c$ and $d$ derives the signal $(a+b+c+d)'$ is called a NOR-element. From the above, it will be seen that a NAND-element becomes a NOR-element and vice versa when the identification of the signal condition (for example, high voltage or low voltage, current or no current) with the symbol (0 or 1) which represents this signal condition is exchanged. Thus, the NAND-element and the NOR-elements are technologically equivalent.

Frequently a signal is identified with a quantity capable of assuming only two values, especially with a digit in the binary system of notation. Obviously the signal value 1 then is associated with the value 1 of this quantity and the signal value 0 with the value 0 of the quantity. In this case it is useful to denote the signal and the quantity by the same character, for example, the signal $a$ is identified with the digit $a$. The complementary signal $a'$ then is also identified with the digit $a$ but this identification is such that the signal value $a'=0$ is identified with the value 1, and the signal value $a'=1$ is identified with the value 0 of the quantity.

Circuits in accordance with the invention are of particular importance as components of the arithmetic unit of an electronic computer. All the signals and circuit elements which relate to the $i^{th}$ digit place are provided with the index $i$. However, the carry formed at the $(i-1)^{th}$ digit place which must be processed in the $i^{th}$ digit place and hence is the input carry for this digit place, is denoted by $c_i$, and the carry which is formed in the $i^{th}$ digit place itself and which consequently is an output carry for this digit place and is to be processed in the $(i+1)^{th}$ digit place, is denoted by $c_{i+1}$.

Hereinafter $a_i$ and $m_i$ are the digits in the $i^{th}$ digit place of two numbers A and M on which an operation is to be performed, and $z_i$ is the digit in the $i^{th}$ digit place of the result Z of this operation. Further, $c_i$ is the input carry, $c_{i+1}$ is the output carry and $D_i$, $E_i$, $K_i$ and $L_i$ are auxiliary signals.

The circuits shown in FIGS. 1 and 2 each have an input stage comprising four input NAND-elements 1, 2, 3, and 4, an intermediate stage comprising a further NAND-element 5, and an output stage comprising two output NAND-elements 6 and 7.

The four NAND-elements of the input stage receive the signals $a_i$, $m_i$, P; $a_i$, $m'_i$, Q; $a'_i$, $m'_i$, R; and $a'_i$, $m_i$, S; respectively, P, Q, R and S being four control signals. The NAND-elements 1 and 2 together generate an auxiliary signal $D'_i$, and the NAND-elements 3 and 4 together generate an auxiliary signal $E_i$. The input carriers $c_i$ and $c'_i$ are each received through three leads.

In the circuit shown in FIG. 1, the intermediate stage in the form of a further NAND-element 5 receives the signals $D'_i$, $E_i$ and $C_i$ and from these generates an auxiliary signal $K'_i$, and in the circuit shown in FIG. 2 the intermediate stage in the form of a further NAND-element 5 receives the signals $D'_i$, $E_i$ and $C'_i$ and from these generates an auxiliary signal $L'_i$.

In the circuit shown in FIG. 1, the first output NAND-element 6 receives the signals $D'_i$, $E_i$ and $K'_i$; in the circuit shown in FIG. 2 this first output NAND-element receives the signals $D'_i$, $E_i$ and $L'_i$. The second output NAND-element 7 in the circuit shown in FIG. 1 receives the signals $K'_i$ and $c_i$, and in the circuit shown in FIG. 2 it receives the signals $L'_i$ and $c'_i$.

The output NAND-elements 6 and 7 generate two signals which in the circuit shown in FIG. 1 together form a signal $z'_i$ and in the circuit shown in FIG. 2 together form a signal $z_i$. In the circuit shown in FIG. 1, the signals $D'_i$ and $K'_i$ together form the signal $c'_i+1$, and in the circuit shown in FIG. 2 the signals $E_i$ and $L'_i$ together produce the signal $c_{i+1}$.

Depending upon the values of the control signals P, Q, R and S the circuit shown in FIGS. 1 and 2 may perform various operations on the digits of the numbers A and M. The table of FIG. 3 shows, for example, that these circuits function as binary full adders when the control signals P, Q, R and S have the values 1, 0, 1 and 0, respectively.

In this table the columns P, Q, R and S give the control signal values. The columns $a_i$, $m_i$, $c_i$, $z_i$ and $c_{i+1}$ give the values of the quantities $a_i$, $m_i$, $c_i$, $z_i$ and $c_{i+1}$. The values given in the columns $D'_i$, $E_i$, $K'_i$, $L'_i z_i^*$, $z'_i{}^*$, $c_{i+1}{}^*$ and $c'_{i+1}{}^*$ are further signal values which may occur. The columns $a'_i$, $m'_i$, $c'_i$, $z'_i$ and $c'_{i+1}$ give the complementary values of the quantities $a_i$, $m_i$, $c_i$, $z_i$ and $c_{i+1}$.

A particular feature of this and the following circuits is that the quantity $z_i$ or its complement $z'_i$ is not generated in the form of a single bivalent signal identified with it, but in the form of a combination of two bivalent signals $z'_i$ (FIG. 1) or $z_i$ (FIG. 2) which, when they are applied to a NAND-element at the outputs thereof are equivalent to the quantity $z_i$ or $z'_i$, as can be read from the Table (see the columns $z'_i{}^*$ with $z_i$ and $z_i{}^*$ with $z'_i$).

Similar considerations apply to the combinations of each two or more signals $c_i$ and $c_{i+1}$ which are identified with the quantities $c_i$ and $c_{i+1}$.

A further feature is that the circuit shown in FIG. 1 must receive the signal $c_i$ and generates the signals $z'_i$ and $c'_{i+1}$, and that the circuit shown in FIG. 2 must receive the signal $c'_i$ and generates the signals $z_i$ and $c_{i+1}$. The circuits shown in FIGS. 1 and 2 (which are identical but for the exchanges or negations of the input and output signals) consequently have to alternate with one another for successively performing an operation on signals which are identified with a digit of an odd-numbered and an even-numbered digit place.

The table of FIG. 4 shows the meaningful operations which may be performed by the unit shown in FIGS. 1 and 2. The table lists the various combinations of values for the control signals P, Q, R and S. The meaningful operational results Z obtained are shown in general form by means of numbers represented by A and M and of the carry represented by $c_o$. In this and the following tables, the symbols commonly used in computer technology represent:

+ arithmetic addition
∸ arithmetic subtraction
∧ conjunction ("and") (per bit)
∨ disjunction ("or") (per bit)
′ negation (per bit)
θ antivalence ("modulo-2") (per bit)

FIGS. 5 and 6 show diagrammatically extended embodiments of a unit in accordance with the invention in which an additional control signal X is used.

FIG. 5 shows the extension for the case in which the unit serves to perform operation on bivalent signals which are identified with the digits in the even-numbered digit places, ($i$ =0, 2, 4, .....). An additional control signal X is applied to the further NAND-elements 5 and to the second output NAND-element 7. This additional control signal X is also applied to a first additional NAND-element 8 to which is also connected the output of a second additional NAND-element 9. The inputs of the second additional NAND-element 9 are connected to the outputs of the input NAND-elements 1 and 2, which generate the signal $D'_i$. The output carry signal $c'_i$ appears at the outputs of the further NAND-element 5 and of the first additional NAND-element 8.

FIG. 6 shows the circuit for performing operations on the bivalent signals which are identified with the digits in the odd-numbered digit places ($i$=1, 3, 5, .....). This circuit corresponds to that shown in FIG. 2 except that one of the input leads $c_i$ has been removed and that a lead for the additional control signal X has been added.

When a parallel unit for performing a number of operations is buildup from the above described devices, a sequence which alternately comprises a device as shown in FIG. 5 and a device as shown in FIG. 6 must be used.

In the table of FIG. 7, the meaningful operations which can be performed by means of the unit shown in FIGS. 5 and 6 are given a manner similar to that used in the table of FIG. 4.

In the former table there are two columns for the results Z of the operations, one for the signal value 1 of the control signal X and the other for the signal value 0 thereof.

It will be seen that when X=1 there is no difference from the unit shown in FIG. 1 and 2, because when X=1 the input terminal concerned is in operative. With X=0, the NAND-elements which receive the signal X at the input terminal are in operative in their entirely.

FIG. 8 and 9 each show a diagram of a further extension at the unit in accordance with the invention, in which two additional control signals X and $X_1$ are used and which includes three additional NAND-elements 8, 9 and 10 for their processing.

FIG. 8 shows the extension for the case where the unit serves to perform operations on bivalent signals which are identified with the digits in the even-numbered digit places ($i$= 0, 2, 4, ...). The additional control signal X is applied to the first additional NAND-element 8, to the further NAND-element 5 and to the second output NAND-element 7. The second additional control signal $X_1$ is applied to the second additional NAND-element 9 to which is also applied the signal $D'_i$ generated at the outputs of the input NAND-elements 1 and 2. The negative of the second additional control signal $X'_1$ is applied to a third additional NAND-element 10 to which is also applied the signal $E_i$ generated at the outputs of the input NAND-elements 3 and 4. The outputs of the additional elements 9 and 10 are connected to further inputs of the additional NAND-element 8. The output carry signal again appears at the outputs of the first additional NAND-element 8 and of the further NAND-element 5.

FIG. 9 shows the extension for the case where the unit serves to perform operations on bivalent signals which are identified with the digits in the odd-numbered digit places ($i$= 1, 3, 5, ....). This unit corresponds to the unit of FIG. 8 with the exception that the additional control signal X is only transmitted directly through a lead, that the second additional control signal $X_1$ is applied to the second additional NAND-element 9 to which is also applied the signal $E_i$ generated at the outputs of the input NAND-elements 3 and 4, and that the negation of the second control signal $X'_1$ is applied to the third additional NAND-element 10 to which is also applied the signal $D'_i$ generated at the outputs of the input NAND-elements 1 and 2. Here also, the NAND-elements 9 and 10 are connected to the inputs of the first additional NAND-element 8.

When a unit for performing a number of operations is buildup from the device described with reference to the FIGS 8 and 9, a sequence which alternately comprises a device as shown in FIG. 8 and a device as shown in FIG. 9 must be used in this case also.

The table of FIG. 10 shows, in a manner similar to that used in the table of FIG. 7, the meaningful operations which the device of FIG. 8 and 9 can perform. There are two columns for the results Z of the operations, one for the case in which the control signal X=1 and the other for the case in which X=0. It will be seen that altogether 47 times a meaningful operation can be performed. The column for the case X=1 shows the new possibilities.

FIGS. 11 and 12 show a fourth embodiment of two cooperating preferred embodiments of the device in accordance with the invention. These devices correspond to the device shown in FIGS. 1 and 2 with the exception that instead of four input NAND-element eight input NAND-elements are used which form two groups of four NAND-elements each (1, 2, 3, 4, and 1$a$, 2$a$, 3$a$, 4$a$ ). The signals $a_i$, $m_i$, $a'_i$ and $m'_i$ which are applied to these NAND-elements (1, 1$a$; 2, 2$a$; etc. respectively) are the same as those used in FIGS. 1 and 2. The following control signals are used: P, Q, R, S, W, V, U and T. The output carry $c'_{i+1}$ of FIG. 11 is again produced by the signal $K'_i$ generated by the further NAND-elements 5 and by the signal $D'_i$ generated by the NAND-elements 1, 2, 1$a$ and 2$a$. The output carry $c_{i+1}$ of FIG. 12 is produced by the signal $L'_i$ generated by the further NAND-element 5 and by the signal $E_i$ generated by the NAND-elements 3, 4, 3$a$ and 4$a$. The table of FIG. 13 shows the meaningful operations which the unit of FIGS. 11 and 12 can perform in accordance with the values of the eight control signals applied to the input NAND-elements.

The table of FIG. 13 shows that altogether 73 meaningful operations can be performed.

What I claim is:

1. An ordered pair of arithmetic units for use in an arithmetic assembly wherein a plurality of ordered unit pairs are serially interconnected said ordered pair comprising a first arithmetic unit and a second arithmetic unit; each of said arithmetic units comprising at least four input-NAND gates having input and output terminals, an intermediate NAND gate, a first output NAND gate, a second output NAND gate, means for connecting an output terminal of each input-NAND gate in each unit to input terminals of the intermediate NAND gate and the first output NAND gate in the same unit, means for connecting an output terminal of the intermediate NAND gate in each unit to input terminals of the first and second output NAND gates in that unit, means for connecting input terminals of the intermediate and second output NAND gates of a unit to a carry signal from an adjacent unit, means for applying a first bivalent information signal to input terminals of a first and second of said input NAND gates in each unit, means for applying the inverse of the first bivalent information to input terminals of a third and fourth of said input-NAND gates in each unit, means for applying a second bivalent information signal to input terminals of the first and fourth input-NAND gates in each unit, means for applying the inverse of the second bivalent information signal to input terminals of the second and third input-NAND gates of each unit, and means for applying a separate bivalent control signal to input terminals of each input-NAND gate in a unit; each of said first arithmetic units further comprising means connected to output terminals of the intermediate NAND gate and the first and second input-NAND gates of each of said first units for forming a first carry signal for an adjacent second unit; and each of said second arithmetic units further comprising means connected to output terminals of the intermediate NAND gate and to the third and fourth input-NAND gates of each of said second units for forming a second carry signal for an adjacent first unit.

2. Apparatus as claimed in claim 1, wherein said first carry signal forming means in each of said first arithmetic units further comprises a first carry signal NAND gate having input and output terminals, a second carry signal NAND gate having input and output terminals, means for connecting input terminals of the first carry signal NAND gate to output terminals of the first and second input-NAND gates in the same unit, means for connecting an output terminal of the first carry signal NAND gate of each first unit to an input terminal of the second carry signal NAND gate in the same unit, and means for connecting a bivalent carry control signal to an input terminal of the second carry signal NAND gate in each first unit, the output of the second carry signal NAND gate forming part of the carry signal for an adjacent second unit in the adder assembly, and wherein said second carry signal forming means in each of said second arithmetic units further comprises conductor means for connecting said bivalent carry control signal as part of said second carry signal for an adjacent first arithmetic unit.

3. Apparatus as claimed in claim 1, wherein said first carry signal forming means in each of said first units further comprises a first carry signal NAND gate having input and output terminals, a second carry signal NAND gate having input and output terminals, a third carry signal NAND gate having input and output terminals, means for connecting output terminals of the first and second input-NAND gates in each first unit to input terminals of the first carry signal NAND gate in the same unit, means for connecting output terminals of the third and fourth input-NAND gates of each first unit to input terminals of the second carry signal NAND gate in the same unit, means for connecting a first bivalent carry control signal to an input terminal of the first carry signal NAND gate in each first unit, means for connecting the inverse of said first bivalent carry control signal to an input terminal of said second carry signal NAND gate in each unit, means for connecting output terminals of the first and second carry signal NAND gates to input terminals of the third carry signal NAND gate, and means for connecting a second bivalent carry control signal to an input terminal of said third carry signal NAND gate; and wherein said second carry signal forming means in each of said second units further comprises a fourth carry signal NAND gate having input and output terminals, a fifth carry signal NAND gate having input and output terminals, a sixth carry signal NAND gate having input and output terminals, means for connecting output terminals of said third and fourth input-NAND gates in each of said second units to input terminals of said fourth carry signal NAND gate in the same unit, means for connecting output terminals of said first and second input-NAND gates in each of second units to input terminals of said fifth carry signal NAND gates in the same unit, means for connecting said first bivalent carry control signal to an input terminal of a fourth carry signal NAND gate in each of said second units, means for connecting an inverse of said carry control signal to an input terminal of a fifth carry signal NAND gate in each of said second units, means for connecting output terminals of the fourth and fifth carry signal NAND gates in each of said second units to input terminals of each sixth carry signal NAND gate in the same unit, and conductor means in each of said second units for connecting said second bivalent carry control signal as part of said second carry signal; said first bivalent carry signal comprising an output of an intermediate NAND gate and an output of a third carry signal NAND gate in each of said first units; and said second carry signal comprising an output of an intermediate NAND gate, an output of a sixth NAND gate and a carry control signal on said conductor means.

4. An ordered pair of arithmetic units for use in an arithmetic assembly wherein a plurality of ordered unit pairs are serially interconnected, said ordered pair comprising a first arithmetic unit and a second arithmetic unit; each of said arithmetic units comprising at least two sets of four input-NAND gates, each of said input-NAND gates having input and output terminals, an intermediate NAND gate having input and output terminals, a first output NAND gate having input and output terminals, a second output NAND gate having input and output terminals, means for connecting an output terminal of each input-NAND gate in a unit to input terminals of the intermediate NAND gate and first output NAND gate of the same unit, means for connecting an output terminal of an intermediate NAND gate in each unit to input terminals of the first and second output NAND gates in the same unit, means for connecting input terminals of an intermediate NAND gate and input terminals of a second output NAND gate of each unit to a carry signal from an adjacent unit, means for applying a first bivalent information signal to input terminals of a first and second input-NAND gate of each set of NAND gates in each unit, means of applying the inverse of the first information signal to input terminals of a third and fourth-input NAND gate of each set of input-NAND gates in each unit, means for applying a second bivalent information signal to input terminals of the first and fourth input-NAND gates of each set of input- NAND gates in each unit, means for applying the inverse of the second information signal to input terminals of the second and third input-NAND gates of each set of input NAND gates in each unit, means for applying a separate one of each of a first ordered set of four bivalent control signals to an input terminal of each input-NAND gate in the first set of input-NAND gates of each unit, means for applying a separate one of each of a second ordered set of four bivalent control signals to an input terminal of each input-NAND gate in the second set of input NAND gates of each unit; each of the first units further comprising means connected to output terminals of the first and second input-NAND gates of each set of input-NAND gates in each first unit and to an output terminal of an intermediate NAND gate in each first unit for forming a first carry signal; and each of said second units further comprising means connected to output terminals of the third and fourth input-NAND gates of each set of input-NAND gates in each second unit and to an output terminal of the intermediate NAND gate in each second unit for forming a second carry signal.

PO-1050
(5/69)

UNITED STATES PATENT OFFICE
CERTIFICATE OF CORRECTION

Patent No. 3,596,075 Dated July 27, 1971

Inventor(s) JAN LEONARDUS VAN WEELDEN

It is certified that error appears in the above-identified patent and that said Letters Patent are hereby corrected as shown below:

Col. 1, line 13, after "input" insert --NAND-elements and the further NAND-element, and a second output--

Col. 3, line 2, "+c" (2nd occurence) should be --+d--.

Signed and sealed this 22nd day of August 1972.

(SEAL)
Attest:

EDWARD M.FLETCHER,JR.
Attesting Officer

ROBERT GOTTSCHALK
Commissioner of Patents